D. L. BRUNDAGE & G. SCHERZ.
AUTOVEHICLE LOCKING MEANS.
APPLICATION FILED JAN. 11, 1917.

1,261,210.

Patented Apr. 2, 1918.

INVENTORS:
D. L. Brundage and G. Scherz,
BY THEIR ATTORNEY:
A. M. Carlsen.

UNITED STATES PATENT OFFICE.

DON L. BRUNDAGE AND GEORGE SCHERZ, OF GLADSTONE, MINNESOTA.

AUTOVEHICLE-LOCKING MEANS.

1,261,210.	Specification of Letters Patent.	Patented Apr. 2, 1918.

Application filed January 11, 1917. Serial No. 141,795.

*To all whom it may concern:*

Be it known that we, DON L. BRUNDAGE and GEORGE SCHERZ, citizens of the United States, residing at Gladstone, in the county of Ramsey and State of Minnesota, have invented a new and useful Autovehicle-Locking Means, of which the following is a specification.

This invention relates to means for locking brake levers and starting levers of machines, and its main object is to enable operators of automobiles, auto trucks, tractors, different cars and motor boats to lock the machinery in idle position and thereby prevent starting and use of the motor or machine for purpose of stealing it or using it without permission.

Figure 4:
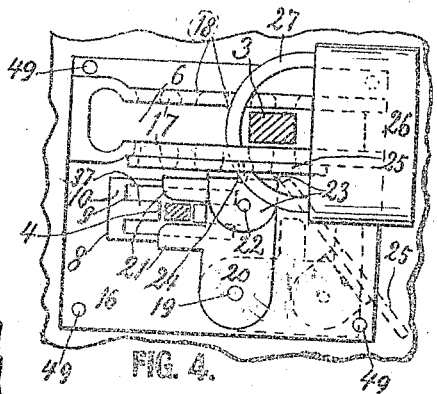
Figure 1:
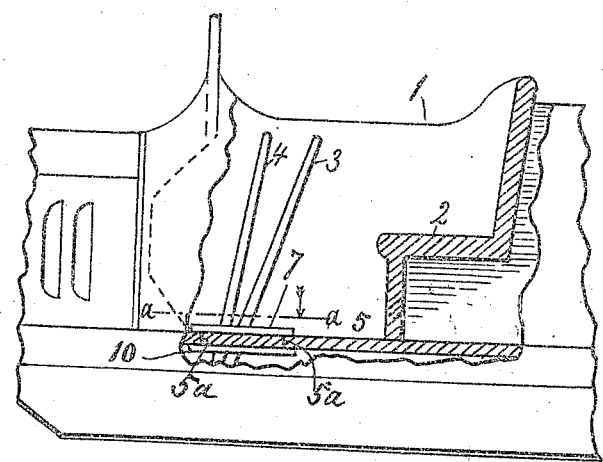
Figure 3:
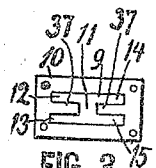
Figure 2:
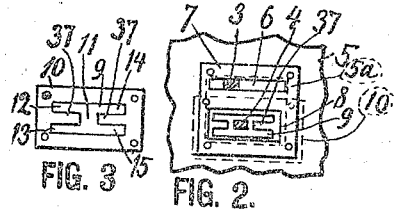
Figure 5:
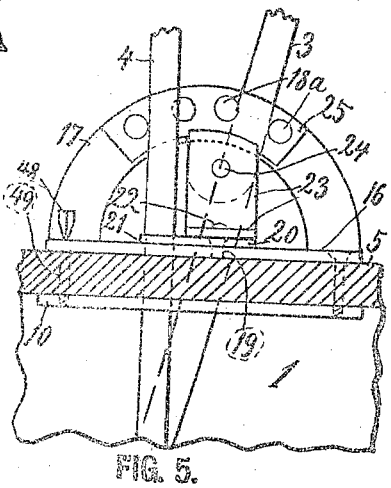

In the accompanying drawing;—Figure 1 is a partly sectional side elevation of the middle portion of an automobile showing the positions of the usual brake lever, and speed changing lever. Fig. 2 is a section on the line *a—a* in Fig. 1. Fig. 3 is a detail plan view of the plate 10 in Figs. 1 and 2. Fig. 4 is an enlargement of Fig. 2 with our locking device applied thereto. Fig. 5 is a side elevation of Fig. 4 with the padlock omitted.

Referring to the drawing by reference numerals, 1 designates the body of an automobile or other auto vehicle having a seat 2 for the operator to sit on and handle a brake lever 3 and in some cases also a speed changing and reversing lever 4. The connections of one or both of said levers with the parts they control, and their use on an automobile are so well known that no description need here be given of same but only of the locking of said levers.

In Figs. 1 and 2 is best shown how, as a rule, the floor 5 of the car is provided with an aperture 5ª for the levers 3, 4 to project up through and be swung back and forth therein. The lever 3 is usually guided in a slot 6 in a plate 7 secured upon the floor; said plate having also a much wider slot 8 for the lever 4, so as to allow said lever to occupy different positions in the aperture in the floor, or in a plate 10 secured below the floor and having an H-shaped aperture 9.

The lever 3 controls the regular brakes of the driving ground wheels of the car, and the lever 4 may also in some cars be used for braking, but its main function is to so control certain clutches and gears that when the lever is at point 11 in Fig. 3 the engine or motor can not start the car at all; and when at points 12 or 13 the car will move forward at slow or fast speed, and if at points 14 or 15 the car will move rearwardly at slow or fast speed. Whenever the lever is thus in a certain position, whether the H-shaped slot is used or not, the car can not be started if the lever be locked either in idle position at 11 or in a position indicating high speed; hence we render the car unmovable by securing said lever 4 in one of said positions, usually in the central position shown in Fig. 2; and we do so, in Figs. 4 and 5, by removing the plate 7, in Figs. 1 and 2, and substituting a plate 16, having similar slots, 6 and 8, and one or two arches or fixed vertical wings 17 with perforations 18.

Pivoted at 19 upon said plate is an arm, 20, having two rigid fingers 21, between which the lever is held against lateral motion as long as it is so engaged, but said arm may also be swung to the dotted position in Fig. 4 and thus set the lever 4 free when it is to be used. Upon the flat arm 20 is pivoted at 22, an angle piece 23, to whose upward arm is pivoted at 24, a segment or small vertical wing 25, having apertures 18ª registering with the apertures 18 in the fixed vertical wing 17 when the fingers 21 engage the lever. Hence to lock the arm 20 in said position it is only necessary to apply a padlock 26 with its bail 27 inserted in one of the apertures 18 and one 18ª, as in Fig. 4. In said view is also shown that the bail may pass through only one of the fixed wings 17 and hence the other arch or wing 17 may be dispensed with if so desired, but if the two arches are there the bail may pass through both of them; and whether one or both arches 17 are used the bail of the same lock may embrace also the brake lever 3 and thus lock the brake in set position, and if the machine has not got the lever 4 the locking means for same may be omitted and only the brake lever 3 locked.

In the operation of the device, it will be understood from a look at Fig. 4 that a single padlock may lock either or both of the levers 3 and 4, the lever 3 by directly embracing it in the bail of the lock, and the lever 4 indirectly by locking together the large vertical wing 17 and the small vertical wing 25, whereby the wing 25 will hold the arm 20 with its fingers 21 straddling the lever 4.

What we claim is:—

The combination with an auto-vehicle having in its floor an H-shaped aperture, of a gear shift lever projecting upward through said aperture and being in neutral position when in the middle of the H-shaped aperture, a slotted plate permanently secured upon the floor about said lever and having a fixed vertical perforated wing, an arm pivoted upon the plate and having two fingers arranged to straddle the lever when it is in neutral position, a second perforated vertical wing pivoted on said arm and adapted to be brought face to face with one side of the fixed vertical-wing, a padlock having its bail inserted in the perforations of the two vertical wings so as to lock the arm with its fingers straddling the lever.

In testimony whereof we affix our signatures.

DON L. BRUNDAGE.
GEORGE SCHERZ.